(12) United States Patent
James

(10) Patent No.: US 11,231,943 B2
(45) Date of Patent: Jan. 25, 2022

(54) SMART SETUP OF ASSISTANT SERVICES

(71) Applicant: Google Inc., Mountain View, CA (US)

(72) Inventor: Barnaby John James, Los Gatos, CA (US)

(73) Assignee: Google LLC, Mountain View, CA (US)

(*) Notice: Subject to any disclaimer, the term of this patent is extended or adjusted under 35 U.S.C. 154(b) by 254 days.

(21) Appl. No.: 15/468,760

(22) Filed: Mar. 24, 2017

(65) Prior Publication Data

US 2018/0276005 A1 Sep. 27, 2018

(51) Int. Cl.
*G06F 9/00* (2006.01)
*G06F 9/451* (2018.01)
*G06Q 30/02* (2012.01)
*G06F 16/951* (2019.01)
*G06Q 10/06* (2012.01)

(52) U.S. Cl.
CPC ............ *G06F 9/453* (2018.02); *G06F 16/951* (2019.01); *G06Q 10/06316* (2013.01); *G06Q 30/0269* (2013.01); *G06Q 30/0282* (2013.01)

(58) Field of Classification Search
CPC . G06F 9/453; G06F 16/951; G06Q 10/06316; G06Q 30/0269; G06Q 30/0282
USPC ........................................................ 715/708
See application file for complete search history.

(56) References Cited

U.S. PATENT DOCUMENTS

| 7,747,749 B1* | 6/2010 | Erikson ............... G06F 16/9574 709/226 |
| 9,275,641 B1 | 3/2016 | Gelfenbeyn et al. |
| 9,443,246 B2* | 9/2016 | Horvitz .................. G06Q 30/02 |
| 9,525,796 B2* | 12/2016 | Nakahara ........... H04N 1/00347 |

(Continued)

FOREIGN PATENT DOCUMENTS

| CN | 102792320 | 11/2012 |
| CN | 104335234 | 2/2015 |

(Continued)

OTHER PUBLICATIONS

Newman, "It's On! 2017 is The Year The Virtual Assistant Wars Get Real," Robot Revolution, retrieved from: https://www.fastcompany.com/3066831/its-on-2017-is-the-year-the-virtual-assistant-wars-get-real, Dec. 28, 2016, 9 pp.

(Continued)

*Primary Examiner* — Cesar B Paula
*Assistant Examiner* — David Faber
(74) *Attorney, Agent, or Firm* — Middleton Reutlinger

(57) ABSTRACT

A digital assistant executing at, at least one processor, is described that is configured to determine a set of candidate third party agents. The digital assistant is further configured to receive, from a computing device that is associated with a user, information indicative of one or more interests of the user and determine based on the information, a set of relevance scores. The digital assistant is further configured to select one or more candidate third party agents from the set of candidate third party agents that have a respective relevance score that satisfies a threshold. Responsive to receiving an indication of user input that accepts a recommendation to configure the user account with the one or more candidate third party agents, the digital assistant is further configured to configure the user account for operation with the one or more candidate third party agents.

20 Claims, 4 Drawing Sheets

(56) References Cited

U.S. PATENT DOCUMENTS

| | | | |
|---|---|---|---|
| 9,691,272 B2* | 6/2017 | Hou | H04L 67/125 |
| 9,704,202 B1* | 7/2017 | Delker | G06Q 30/0631 |
| 10,055,978 B2* | 8/2018 | Ham | H04B 1/40 |
| 10,168,676 B2* | 1/2019 | Patel | H04L 12/2803 |
| 10,580,409 B2* | 3/2020 | Walker, II | G10L 13/02 |
| 10,699,717 B2* | 6/2020 | Orr | H04L 12/282 |
| 2004/0153373 A1 | 8/2004 | Song et al. | |
| 2008/0270151 A1* | 10/2008 | Mahoney | G06Q 30/02 705/1.1 |
| 2009/0187944 A1* | 7/2009 | White | H04N 7/173 725/46 |
| 2009/0319947 A1* | 12/2009 | Wang | G06F 3/04817 715/810 |
| 2011/0106796 A1* | 5/2011 | Svaic | G06F 16/954 707/728 |
| 2012/0054065 A1 | 3/2012 | Sung et al. | |
| 2013/0055097 A1* | 2/2013 | Soroca | G06Q 30/0247 715/738 |
| 2013/0166585 A1* | 6/2013 | Das Sarma | G06F 16/242 707/767 |
| 2013/0173568 A1* | 7/2013 | Josifovski | G06F 16/951 707/706 |
| 2013/0275164 A1* | 10/2013 | Gruber | G10L 17/22 705/5 |
| 2013/0311997 A1 | 11/2013 | Gruber et al. | |
| 2013/0346068 A1 | 12/2013 | Solem et al. | |
| 2014/0244712 A1* | 8/2014 | Walters | G06F 3/167 709/202 |
| 2014/0313867 A1* | 10/2014 | Lee | G06F 1/3206 368/223 |
| 2014/0317502 A1* | 10/2014 | Brown | G06F 9/453 715/706 |
| 2015/0106687 A1* | 4/2015 | McLaughlin | G06Q 30/02 715/234 |
| 2015/0121216 A1* | 4/2015 | Brown | G06N 3/006 715/707 |
| 2015/0154976 A1* | 6/2015 | Mutagi | H04L 12/281 704/275 |
| 2015/0162000 A1 | 6/2015 | Di Censo et al. | |
| 2015/0278696 A1 | 10/2015 | Moon et al. | |
| 2016/0012055 A1* | 1/2016 | Bai | G06F 16/9535 707/734 |
| 2016/0077910 A1* | 3/2016 | Dev | G06F 11/0793 714/4.3 |
| 2016/0165038 A1* | 6/2016 | Lim | G06Q 10/109 715/728 |
| 2016/0232131 A1* | 8/2016 | Liu | G06Q 10/06 |
| 2016/0232201 A1* | 8/2016 | Goran | G06F 3/017 |
| 2016/0234184 A1* | 8/2016 | Liu | G06F 16/583 |
| 2016/0260135 A1* | 9/2016 | Zomet | H04L 12/2834 |
| 2016/0335138 A1* | 11/2016 | Surti | G06F 9/44526 |
| 2017/0091612 A1* | 3/2017 | Gruber | G06F 40/169 |
| 2017/0125035 A1* | 5/2017 | Gao | G08C 23/02 |
| 2017/0132199 A1* | 5/2017 | Vescovi | G06F 40/186 |
| 2017/0250935 A1* | 8/2017 | Rosenberg | H04L 51/16 |
| 2018/0196865 A1* | 7/2018 | Rabin | H04L 63/0428 |
| 2018/0246899 A1* | 8/2018 | Natchu | G06F 16/958 |

FOREIGN PATENT DOCUMENTS

| | | |
|---|---|---|
| CN | 104735614 | 6/2015 |
| CN | 105247511 | 1/2016 |
| CN | 105262832 | 1/2016 |
| CN | 104584096 | 9/2017 |
| CN | 101493828 | 7/2020 |
| EP | 2924623 | 9/2015 |
| WO | 2010145882 | 12/2010 |

OTHER PUBLICATIONS

Badcock, "First Alexa Third-Party Skills Now Available for Amazon Echo," Alexa Blogs, retrieved from: https://developer.amazon.com/blogs/post/TxC2VHKFEIZ9SG/First-Alexa-Third-Party-Skills-Now-Available-for-Amazon-Echo, Aug. 17, 2015, 5 pp.
API AI, "Build Conversation Actions for Google Assistant Users," retrieved from: https://api.ai/blog/2016/12/08/build-conversation-actions-for-the-google-assistant/, Dec. 8, 2016, 2 pp.
Amazon, "Alexa Skills," retrieved from: https://www.amazon.com/alexa-skills/b/ref=topnav_storetab_a2s?ie=UTF8&node=13727921011, Jan. 26, 2017, 3 pp.
O'Hear, "Api.ai. Makes It Easier to Add a Siri-Like Conversational UI To Your IoT App or Device," retrieved from https://techcrunch.com/2015/05/18/api-ai/, May 18, 2015, 7 pp.
U.S. Appl. No. 15/603,092, filed May 23, 2017, by Ibrahim Badr.
International Search Report and Written Opinion of PCT Ser. No. PCT/US2017/059338; 12 pages dated Jan. 4, 2018.
United Kingdom Intellectual Property Office; Combined Search and Examination Report issued in Application No. GB1717846.8 dated Apr. 20, 2018.
United Kingdom Intellectual Property Office; Examination Report issued in Application No. GB1717846.8 dated Nov. 30, 2018.
United Kingdom Intellectual Property Office; Examination Report issued in Application No. GB1717846.8 dated Apr. 6, 2020.
European Patent Office; Summons to attend oral proceedings pursuant to Rule 115(1) EPC; 9 pages; dated Aug. 3, 2020.
European Patent Office; Communication Pursuant to Article 94(3) issue in Application No. 17805015.9; dated Mar. 12, 2020.
United Kingdom Intellectual Property Office; Decision by a Hearing Officer issued in Application No. GB1717846.8; 9 pages; dated Sep. 30, 2020, 9 pages.
Amazon; Alexa software to control remote lighting and thermostats; https://www.luxreview.com/2016/09/15/meet-alexa-amazon-s-new-device-that-can-control-your-home-lighting/; 9 pages; dated 2016.
China National Intellectual Property Administration; Notification of First Office Action for application No. 201711144894.1; 19 pages; dated Oct. 12, 2020.

* cited by examiner

SMART SETUP OF ASSISTANT SERVICES

BACKGROUND

Some computing platforms may provide a user interface from which a user can chat, speak, or otherwise communicate with a virtual, computational assistant (e.g., also referred to as "an intelligent digital assistant", "a digital assistant", or simply "an assistant") to cause the assistant to output useful information, respond to a user's needs, or otherwise perform certain operations to help the user complete a variety of real-world or virtual tasks. To determine useful information, the assistant may work with a third party (3P) agent server system. For example, a computing device receives, with a microphone, voice input (e.g., audio data) from a user. An assistant executing at least in part at the computing device outputs an indication of the voice input to a third party agent server system. Upon receiving useful information from the third party agent server system that is based on the voice input, the assistant executing at least in part at the computing device outputs the useful information to the user.

SUMMARY

In general, techniques of this disclosure may enable a digital assistant to recommend agents (also referred to as "software agents") for responding to user input (e.g., for satisfying user utterances or textual input). For example, during an initial setup of a digital assistant, with permission from a user, a computing device may determine that the user of the digital assistant uses services outside of the digital assistant that are provided by a particular vender. In this example, the computing device may further determine that the particular vender is associated with an agent that is available for using services of the particular vender. An agent may refer to software, that when executed by a processor, autonomously interacts with the digital assistant, other agents, and/or systems to accomplish tasks on behalf of a user of the digital assistant. Agents may be configured to interact with users in natural language (e.g., "you can use this agent to order a taxi", "you can use this agent to find food recipes"). Agents may be separate from the digital assistant. For example, agents may operate at a different processor or server than the digital assistant. Agents may be capable of providing services in addition to services provided by the digital assistant. For instance, an agent may provide services of a third party vender that the digital assistant is not configured to provide. Examples of agents may include first and third party digital agents configured to provide services associated with, for example, but not limited to, news media (e.g., a news feed, sports scores), food ordering (e.g., ordering food delivered), television (e.g., a recipe discussed in a television show), transportation (e.g., requesting automobile transportation or any other type of transportation), medical (e.g., a description of medical terms, ordering prescription refills), and other services. The digital assistant may output a recommendation for the agent for using services of the particular vender.

Rather than requiring the user search through lists of agents, a digital assistant may recommend agents that are likely to be used by the user. For example, the digital assistant may determine, with user permission, services that the user already uses, and recommend agents for using the services that the user already uses. In another example, the digital assistant may determine that a user has setup a user account for obtaining services from a particular service provider. In this manner, the digital assistant may recommend agents for the digital assistant that are likely to be used by the user.

In one example, the disclosure is directed to a method that includes determining, by a digital assistant device, a set of candidate third party agents for a digital assistant service. The set of candidate third party agents are accessible via the digital assistant device. The method further includes receiving, by the digital assistant device, from a computing device that is associated with a user, information indicative of one or more interests of the user and determining, by the digital assistant device, based on the information, a set of relevance scores. Each relevance score of the set of relevance scores is indicative of whether the user will initiate at least one task requiring a respective candidate third party agent of the set of candidate third party agents. The method further includes selecting, by the digital assistant device, one or more candidate third party agents from the set of candidate third party agents that have a respective relevance score that satisfies a threshold and outputting an indication of a recommendation to configure a user account of the digital assistant service with the one or more candidate third party agents. The user account of the digital assistant service is associated with the user. Responsive to receiving an indication of user input that accepts the recommendation to configure the user account of the digital assistant service with the one or more candidate third party agents, the method further includes configuring, by the digital assistant device, the user account of the digital assistant service for operation with the one or more candidate third party agents.

In another example, the disclosure is directed to a digital assistant device including at least one processor; and at least one memory. The at least one memory includes instructions that when executed, cause the at least one processor to provide a digital assistant configured to determine a set of candidate third party agents for a digital assistant service. The set of candidate third party agents is accessible via the digital assistant device. The digital assistant is further configured to receive, from a computing device that is associated with a user, information indicative of one or more interests of the user and determine based on the information, a set of relevance scores. Each relevance score of the set of relevance scores is indicative of whether the user will initiate at least one task requiring a respective candidate third party agent of the set of candidate third party agents. The digital assistant is further configured to select one or more candidate third party agents from the set of candidate third party agents that have a respective relevance score that satisfies a threshold, where an indication of a recommendation to configure a user account of the digital assistant service with the one or more candidate third party agents is output and wherein the user account of the digital assistant service is associated with the user. Responsive to receiving an indication of user input that accepts the recommendation to configure the user account of the digital assistant service with the one or more candidate third party agents, the digital assistant is further configured to configure the user account of the digital assistant service for operation with the one or more candidate third party agents.

In another example, the disclosure is directed to a computer-readable storage medium comprising instructions that, when executed cause at least one processor to provide a digital assistant configured to determine a set of candidate third party agents for a digital assistant service. The set of candidate third party agents is accessible via the digital assistant device. The instructions further cause at least one processor to receive, from a computing device that is associated with a user, information indicative of one or more interests of the user and to determine, based on the information, a set of relevance scores. Each relevance score of the set of relevance scores is indicative of whether the user will initiate at least one task requiring a respective candidate third party agent of the set of candidate third party agents. The instructions further cause at least one processor to select one or more candidate third party agents from the set of candidate third party agents that have a respective relevance score that satisfies a threshold, where an indication of a recommendation to configure a user account of the digital assistant service with the one or more candidate third party agents is output and wherein the user account of the digital assistant service is associated with the user. Responsive to receiving an indication of user input that accepts the recommendation to configure the user account of the digital assistant service with the one or more candidate third party agents, the instructions further cause at least one processor to configure the user account of the digital assistant service for operation with the one or more candidate third party agents.

In another example, the disclosure is directed to a system that includes means for determining a set of candidate third party agents for a digital assistant service. The set of candidate third party agents are accessible via the digital assistant device. The system further includes means for receiving, from a computing device that is associated with a user, information indicative of one or more interests of the user and means for determining, based on the information, a set of relevance scores. Each relevance score of the set of relevance scores is indicative of whether the user will initiate at least one task requiring a respective candidate third party agent of the set of candidate third party agents. The system further includes means for selecting one or more candidate third party agents from the set of candidate third party agents that have a respective relevance score that satisfies a threshold and means for outputting an indication of a recommendation to configure a user account of the digital assistant service with the one or more candidate third party agents. The user account of the digital assistant service is associated with the user. Responsive to receiving an indication of user input that accepts the recommendation to configure the user account of the digital assistant service with the one or more candidate third party agents, the system further includes means for configuring the user account of the digital assistant service for operation with the one or more candidate third party agents.

DETAILED DESCRIPTION

Figure 1:
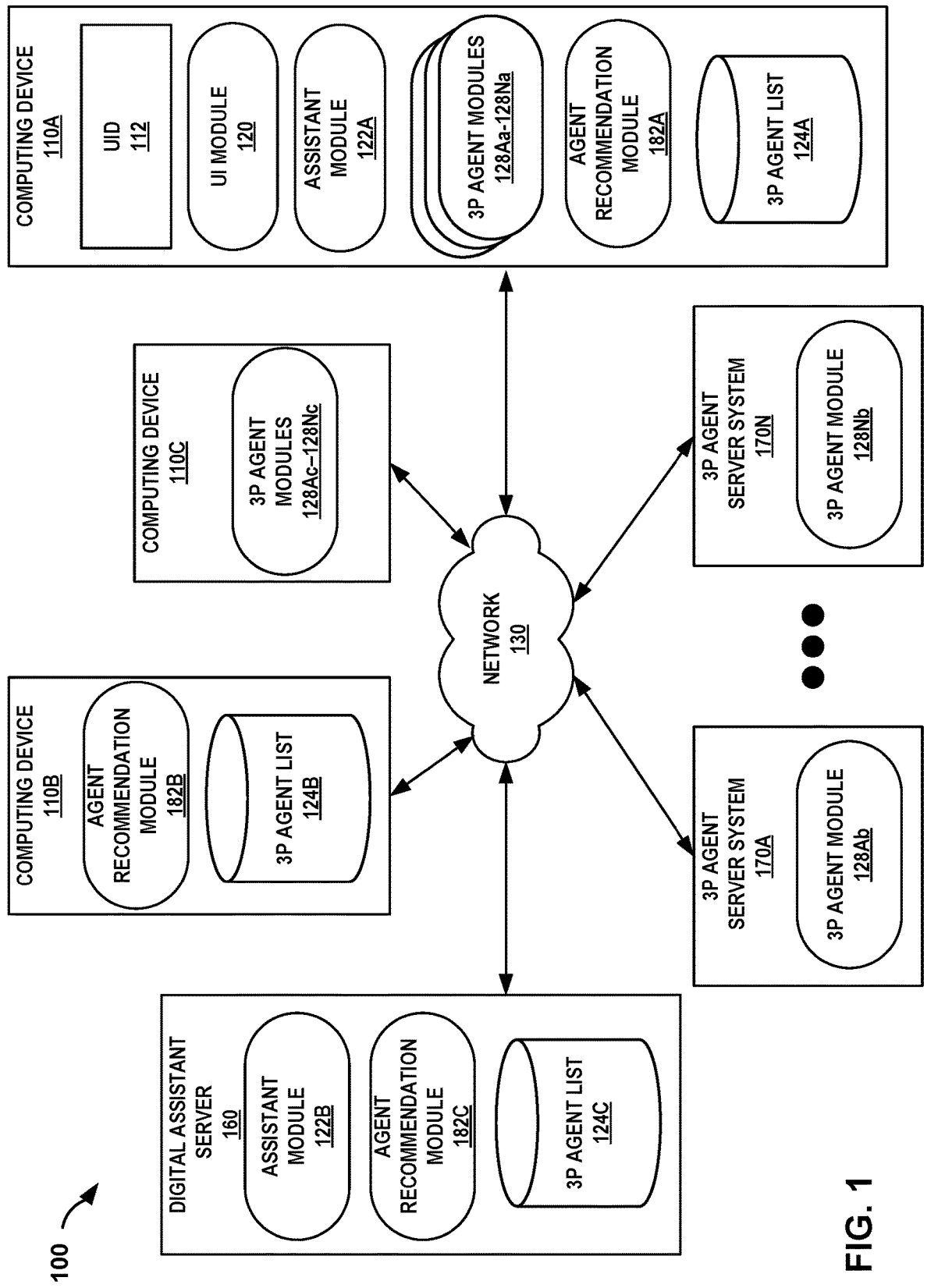
FIG. 1 is a conceptual diagram illustrating an example system that executes an example digital assistant, in accordance with one or more aspects of the present disclosure.

In general, techniques of this disclosure enable an improved out-of-box experience when initially setting up a digital assistant for responding to user input (e.g., for satisfying user utterances or textual input). In some systems, the out-of-box experience may require that a user choose, from a list of available agents, one or more agents that the user is likely to use services of. For example, upon initially powering on a computing device for executing the digital assistant, a user may provide input at a graphical user interface associated with the digital assistant to select, or unselect, agents for services available from the digital assistant that the user will or will not use.

Rather than requiring the user to identify each agent that he or she may be interested in, the digital assistant may recommend specific agents that are likely to be used by the user. For example, during an initial setup of a digital assistant, after explicitly having obtained permission from a user, a computing device may determine that the user of the digital assistant uses services outside of the digital assistant that are provided by a particular vender. The computing device may determine that the particular vender is associated with an available agent for using services of the particular vender, and the digital assistant may output a recommendation for the agent for using services of the particular vender. For instance, in response to determining that an e-mail account associated with the user of the digital assistant indicates the user recently ordered pizza from Pizza Company X, the digital assistant may recommend a particular agent for ordering pizza from Pizza Company X. In this manner, the digital assistant may direct the user to agents that the user will likely use rather than inundating the user with an amalgamation of agents that are useful to the user and agents that are useless to the user.

To identify services used by a user outside of the digital assistant, the digital assistant may determine, with user permission, whether an application installed on a computing device for the user has corresponding agents for use with the digital assistant. For example, the digital assistant may receive, from a computing device, information indicating that the user has installed an application for scheduling a flight with a particular airline company. In this example, in response to identifying an agent for scheduling a flight with the particular airline company, the digital assistant may recommend that the user allow the digital assistant to enable the agent for scheduling of future flights with the particular airline company.

Further, to identify services, the digital assistant may determine whether a computing device available for connection on a local area network (e.g., LAN) has a corresponding agent for use with the digital assistant. For example, the digital assistant may receive an indication that a computing device having a media access control address (MAC address) associated with a smart lighting system is available for connection using the LAN. In this example, response to identifying an agent for controlling the smart lighting system using the digital assistant, the digital assistant recommends the agent for controlling the smart lighting system.

The digital assistant may only maintain or have access to information associated with the user after first receiving explicit permission from the user to do so. Thus, the user may have complete control over how the assistant collects and uses information about the user. Before the digital assistant stores personal information, the digital assistant may encrypt or otherwise treat the information to remove the actual identity of the user, so that personally-identifiable information is removed while being stored. The digital assistant may provide a way for the user to modify or remove information maintained by the digital assistant. In this way, the user may have complete control over the information being retained by the digital assistant.

Once the digital assistant has received permission to configure a user account of the digital assistant service with a recommended agent, the digital assistant can immediately configure the user account for operation with the recommended agent. For example, the assistant can retrieve data necessary for operating the recommended agent. Additionally, to further reduce a setup time, the digital assistant may, with user permission, automatically setup a third party user account for the recommended agent. In this way, the user may configure a digital assistant module with the recommended agent without necessarily inundating the user with trivial and repetitive requests for user information.

FIG. 1 is a conceptual diagram illustrating an example system 100 that executes an example digital assistant, in accordance with one or more aspects of the present disclosure. System 100 of FIG. 1 includes computing devices 110A-C (collectively, computing devices 110), in communication, via network 130, with digital assistant server 160 and third party (3P) agent server systems 170A-N (collectively, "third party agent server systems 170"). Although system 100 is shown as being distributed amongst digital assistant server 160, third party agent server systems 170, and computing devices 110, in other examples, the features and techniques attributed to system 100 may be performed internally, by local components of computing devices 110. Similarly, digital assistant server 160 and/or third party agent server systems 170 may include certain components and perform various techniques that are otherwise attributed in the below description to computing devices 110.

Network 130 represents any public or private communications network, for instance, cellular, Wi-Fi, and/or other types of networks, for transmitting data between computing systems, servers, and computing devices. Digital assistant server 160 may exchange data, via network 130, with computing devices 110 to provide a virtual assistance service that is accessible to computing device 110A when computing devices 110 are connected to network 130. Similarly, third party agent server systems 170 may exchange data, via network 130, with computing devices 110 to provide virtual agents services that are accessible to computing devices 110 when computing devices 110 are connected to network 130.

Network 130 may include one or more network hubs, network switches, network routers, or any other network equipment, that are operatively inter-coupled thereby providing for the exchange of information between server systems 160 and 170, and computing devices 110. Computing devices 110, digital assistant server 160, and third party agent server systems 170 may transmit and receive data across network 130 using any suitable communication techniques. Computing devices 110, digital assistant server 160, and third party agent server systems 170 may each be operatively coupled to network 130 using respective network links. The links coupling computing devices 110, digital assistant server 160, and third party agent server systems 170 may be Ethernet or other types of network connections and such connections may be wireless and/or wired connections.

Digital assistant server 160 and third party agent server systems 170 represent any suitable remote computing systems, such as one or more desktop computers, laptop computers, mainframes, servers, cloud computing systems, etc. capable of sending and receiving information both to and from a network, such as network 130. Digital assistant server 160 hosts (or at least provides access to) a digital assistant service. Third party agent server systems 170 host (or at least provide access to) virtual language agents. In some examples, digital assistant server 160 and third party agent server systems 170 represent cloud computing systems that provide access to their respective services via the cloud.

Computing devices 110 represent individual mobile or non-mobile computing devices. Examples of computing devices 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or home assistant device), a personal digital assistants (PDA), a gaming system, a media player, an e-book reader, a mobile television platform, an automobile navigation or infotainment system, or any other type of mobile, non-mobile, wearable, and non-wearable computing device configured to execute or access a digital assistant and receive information via a network, such as network 130.

Each of computing devices 110 may perform different functions of system 100. For example, computing device 110A may perform a function of a mobile device. In this example, computing device 110B may perform a function of a digital assistant device for configuring the digital assistant device. In this example, computing device 110C may perform a function of a third party agent system. For instance, computing device 110C may be a smart lighting system associated with third party agent 128Ab of third party agent server system 170A.

Computing device 110A includes user interface device (UID) 112, user interface (UI) module 120, assistant module 122A, third party agent modules 128Aa-Na, agent recommendation modules 182A, and third party agent list 124A. Modules 120, 122A, 128Aa-Na, and 182A may perform operations described using software, hardware, firmware, or a mixture of hardware, software, and firmware residing in and/or executing at respective computing device 110A. Computing device 110A may execute modules 120, 122A, 128Aa-Na, and 182A with multiple processors or multiple devices. Computing device 110A may execute modules 120, 122A, 128Aa-Na, and 182A as virtual machines executing on underlying hardware. Modules 120, 122A, 128Aa-Na, and 182A may execute as one or more services of an operating system or computing platform. Modules 120, 122A, 128Aa-Na, and 182A may execute as one or more executable programs at an application layer of a computing platform.

Similarly, module 182B may perform operations described using software, hardware, firmware, or a mixture of hardware, software, and firmware residing in and/or executing at respective computing device 110B. Computing device 110B may execute module 182B with multiple processors or multiple devices. Computing device 110B may execute module 182B as virtual machines executing on underlying hardware. Module 182B may execute as one or more services of an operating system or computing platform. Modules 182B may execute as one or more executable programs at an application layer of a computing platform. Further, modules 128Ac-128Nc may perform operations described using software, hardware, firmware, or a mixture of hardware, software, and firmware residing in and/or executing at respective computing device 110C. Computing device 110C may execute modules 128Ac-128Nc with multiple processors or multiple devices. Computing device 110C may execute modules 128Ac-128Nc as virtual machines executing on underlying hardware. Modules 128Ac-128Nc may execute as one or more services of an operating system or computing platform. Modules 128Ac-128Nc may execute as one or more executable programs at an application layer of a computing platform.

Each of computing devices 110 may include one or more modules of computing device 110A. For example, computing device 110B may include an agent recommendation module that is substantially similar to agent recommendation modules 182A of computing device 110A and an third party agent list that is substantially similar to third party agent list 124A of computing device 110A. In another example, computing device 110C may include third party agent modules that are substantially similar to third party agent modules 128Aa-128Na of computing device 110A. It should be understood that computing device 110 may include additional modules not shown in FIG. 1. For instance, computing device 110B may further include a UID that is substantially similar to UID 112 of computing device 110A and a UI module that is substantially similar to UI module 120 of computing device 110A.

Computing device 110A may communicate with digital assistant server 160 and/or third party agent server systems 170 via network 130 to access the digital assistant service provided by digital assistant server 160 and/or the virtual language agents provided by third party agent server systems 170. In the course of providing digital assistant services, digital assistant server 160 may communicate with third party agent server systems 170 via network 130 to engage one or more of the virtual language agents provided by third party agent server systems 170 to provide a user of the digital assistant service additional assistance.

In the example of FIG. 1, digital assistant server 160 includes assistant module 122B, agent recommendation modules 182C, and third party agent list 124C. Assistant module 122B may access third party agent list 124C as part of a digital assistant service that digital assistant server 160 provides via network 130 (e.g., to computing device 110A). Agent list 124C may include a list of registered agents for the digital assistant service. Computing device 110A includes user interface device (UID) 112, user interface (UI) module 120, assistant module 122A, third party agent modules 128Aa-Na, agent recommendation modules 182A, and third party agent list 124A. Computing device 110B includes agent recommendation modules 182B and third party agent list 124B. Computing device 110C includes third party agent modules 128Ac-Nc. Agent recommendation modules 182A may maintain third party agent list 124A as part of a digital assistant service that executes locally at computing device 110A. Agent recommendation module 182B may maintain third party agent list 124B as part of a digital assistant service that executes locally at computing device 110B. Agent recommendation modules 182A-C may be referred to collectively as agent recommendation modules 182. Assistant modules 122A-B may be referred to collectively as assistant modules 122. third party agent list 124A and B may be referred to collectively as third party agent lists 124.

Modules 122 and 182 may perform operations described using software, hardware, firmware, or a mixture of hardware, software, and firmware residing in and/or executing at, respectively, digital assistant server 160. Similarly, modules 128 may perform operations described using software, hardware, firmware, or a mixture of hardware, software, and firmware residing in and/or executing at, respectively, third party agent server systems 170. Digital assistant server 160 and third party agent server systems 170 may execute, respectively, modules 122B and 182C and modules 128A-N with multiple processors, multiple devices, as virtual machines executing on underlying hardware, or as one or more services of an operating system or computing platform. In some examples, modules 122B and 182C and modules 128A-N may execute as one or more executable programs at an application layer of a computing platform of, respectively, digital assistant server 160 and third party agent server systems 170.

UID 112 of computing device 110A may function as an input and/or output device for computing device 110A. UID 112 may be implemented using various technologies. For instance, UID 112 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. In addition, UID 112 may include microphone technologies, infrared sensor technologies, or other input device technology for use in receiving user input.

UID 112 may function as output (e.g., display) device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110A. In addition, UID 112 may include speaker technologies, haptic feedback technologies, or other output device technology for use in outputting information to a user.

UID 112 may include a presence-sensitive display that may receive tactile input from a user of computing device 110A. UID 112 may receive indications of tactile input by detecting one or more gestures from a user (e.g., the user touching or pointing to one or more locations of UID 112 with a finger or a stylus pen). UID 112 may present output to a user, for instance at a presence-sensitive display. UID 112 may present the output as a graphical user interface, which may be associated with functionality provided by computing device 110A and/or a service being accessed by computing device 110A.

For example, UID 112 may present a user interface related to a digital assistant provided by assistant module 122 that UI module 120 accesses on behalf of computing device 110A. UID 112 may present a user interface related to other features of computing platforms, operating systems, applications, and/or services executing at or accessible from computing device 110A (e.g., e-mail, chat, or other electronic message applications, Internet browser applications, telephone applications, mobile or desktop operating systems, etc.).

UI module 120 may manage user interactions with UID 112 and other components of computing device 110A including interacting with digital assistant server 160 so as to provide autonomous search results at UID 112. UI module 120 may cause UID 112 to output a user interface for display, as a user of computing device 110A views output and/or provides input at UID 112. UI module 120 and UID 112 may receive one or more indications of input from a user as the user interacts with the user interface, at different times and when the user and computing device 110A are at different locations. UI module 120 and UID 112 may interpret inputs detected at UID 112 and may relay information about the inputs detected at UID 112 to one or more associated platforms, operating systems, applications, and/or services executing at computing device 110A, for example, to cause computing device 110A to perform functions.

UI module 120 may receive information and instructions from one or more associated platforms, operating systems, applications, and/or services executing at computing device 110A and/or one or more remote computing systems, such as server systems 160 and 180. In addition, UI module 120 may act as an intermediary between the one or more associated platforms, operating systems, applications, and/or services executing at computing device 110A, and various output devices of computing device 110A (e.g., speakers, LED indicators, audio or haptic output device, etc.) to produce output (e.g., a graphic, a flash of light, a sound, a haptic response, etc.) with computing device 110A.

Assistant module 122A of computing device 110A and assistant module 122B of digital assistant server 160 may each perform similar functions described herein for automatically executing an assistant that is configured to select agents to satisfy user input (e.g., spoken utterances, textual input, etc.) received from a user of a computing device. Assistant module 122B and third party agent list 124B represent server-side or cloud implementations of an example digital assistant whereas assistant modules 122A and B and third party agent lists 124A and B represent a client-side or local implementation of the example digital assistant.

Assistant modules 122 may each include respective software agents (e.g., also referred to as "agents") configured to execute as intelligent personal assistants that can perform tasks or services for an individual, such as a user of computing device 110A. Assistant modules 122 may perform these tasks or services based on user input (e.g., detected at UID 112), location awareness (e.g., based on context), and/or the ability to access other information (e.g., weather or traffic conditions, news, stock prices, sports scores, user schedules, transportation schedules, retail prices, etc.) from a variety of information sources (e.g., either stored locally at computing device 110A, digital assistant server 160, or obtained via a search service. Assistant modules 122 may perform artificial intelligence and/or machine learning techniques to automatically identify and complete one or more tasks on behalf of a user.

In some examples, the assistants provided by assistant modules 122 can be referred to as first party (1P) assistants and/or first party agents. For instance, the agents represented by assistant modules 122 may share a common publisher and/or a common developer with an operating system of computing device 110A and/or an owner of digital assistant server 160. As such, in some examples, the agents represented by assistant modules 122 may have abilities not available to other agents, such as third party agents. In some examples, the agents represented by assistant modules 122 may not both be first party agents. For instance, the agent represented by assistant module 122A may be a first party agent whereas the agent represented by assistant module 122B may be a third party agent.

As discussed above, assistant module 122A may represent a software agent configured to execute as an intelligent personal assistant that can perform tasks or services for an individual, such as a user of computing device 110A. In some examples, assistant module 122A may utilize other agents to perform tasks or services for the individual.

In the example of FIG. 1, third party agent server systems 170 include third party agent modules 128b. Third party agent modules 128Ab-Nb (collectively, "third party agent modules 128b") and third party agent modules 128Ac-Nc (collectively, "third party agent modules 128c") may perform similar functions described below with respect to third party agent modules 128Aa-Na (collectively, "agent modules 128a") to automatically execute an agent that is configured to satisfy utterances received from a user of a computing device, such as computing device 110A. In other words, third party agent modules 128b represent server-side or cloud implementations of example third party agents whereas third party agent modules 128a and c represent client-side or local implementations of the example third party agents.

In some examples, each of modules 128a-c (collectively, "modules 128") may represent software agents configured to execute as intelligent personal assistants that can perform tasks or services for an individual, such as a user of computing device 110A. In some examples, each of modules 128 may represent software agents that may be utilized by the assistants provided by modules 122. In some examples, the assistants and/or agents provided by modules 128 be referred to as third party assistants and/or third party agents. For instance, the assistants and/or agents represented by modules 128 may not share a common publisher with an operating system of computing device 110A and/or an owner of digital assistant server 160. As such, in some examples, the assistants and/or agents represented by modules 128 may not have abilities that are available to other assistants and/or agents, such as first party assistants and/or agents.

Third party agent modules 128 may be associated with any suitable service. Example categories of services that third party agent modules 128 may provide include, for example, but not limited to, business, finance, automobile, education, reference, food, drink, games, trivia, health, fitness, lifestyle, local, movies, television, music, audio, news, novelty, humor, productivity, shopping, smart home, social, sports, travel, transportation, utilities, and other categories of services. More specifically, third party modules 128 may provide services associated with, for example, but not limited to, news media (e.g., a news feed, sports scores), food ordering (e.g., ordering food delivered), television (e.g., a recipe discussed in a television show), transportation (e.g., requesting automobile transportation or any other type of transportation), medical (e.g., a description of medical terms, ordering prescription refills), and other services.

In operation, agent recommendation modules 182 may determine third party agent modules 128 for a digital assistant service. For example, agent recommendation modules 182 may determine third party agent modules 128 as third party agent modules that are accessible via computing device 110A. For instance, agent recommendation modules 182 may include third party agent modules 128 in third party agent list 124A when each of third party agent server systems 170 may be accessed, via network 130, by computing devices 110.

Agent recommendation modules 182 may recommend a selection of third party agent modules 128 based on popularity of that agent, or may provide a user interface from which a user can browse through a complete list of third party agent modules 128. Rather than recommending a selection of third party agent module 128 based solely on a popularity or requiring a user to browse through a complete list of third party agent modules 128, agent recommendation modules 182 may work with computing devices 110 to identify information indicative of interests of the user. In this way, agent recommendation modules 182 may alert the user to useful third party agent modules 128 that avoids overwhelming the user with an amalgamation of useful and nonviable third party agent modules 128.

More specifically, agent recommendation modules 182 may receive information indicative of one or more interests of the user from computing devices 110. Such interests of a user may include subjective interests (e.g., being a fan of sports team A). Additionally, or alternatively, interests of a user may include objective interests (e.g., controlling a home thermostat). For example, the user may be interested in controlling a home thermostat to simply accomplish the task of reducing a temperature in a home without a desire to interact with the home thermostat. Examples of information indicative of one or more interests of the user may include, but is not limited to, installed applications at computing devices 110, third party accounts that are linked with a user account for the user, a website browser history at computing devices 110, e-mail associated with the user account for the user, an availability of devices connected to network 130 (e.g., computing devices 110), user interaction at computing devices 110, and other information indicative of one or more interests of the user. In some examples, agent recommendation modules 182 may determine third party agent lists 124 as a sub-set of one or more of third party agent modules 128 based the information indicative of one or more interests of the user. For example, in response to determining that the information indicative of one or more interests of the user relates to third party agent modules 128A-C, agent recommendation modules 182 may determine third party agent lists 124 as third party agent modules 128A-C.

Agent recommendation modules 182 may determine a set of relevance scores based on the information indicative of interests of the user. For example, agent recommendation modules 182 may increase a relevance score of third party agent module 128A when the information indicates that the user utilizes services of a particular vender that is associated with third party agent module 128A. For instance, in response to receiving an indication that the user has recently ordered consumer products from a particular website for ordering products from a first particular vender and that third party agent module 128A is configured to permit the user to order consumer products from the first particular vender, agent recommendation modules 182 may increase a relevance score for third party agent module 128A. In response, however, to determining from information indicative of interests of the user that the user has not utilized services of a second particular vender and that third party agent module 128B is configured to permit the user to order consumer products from the second particular vender, agent recommendation modules 182 may refrain from increasing (e.g., not change) or may decrease the relevance score for third party agent module 128B. In this manner, each relevance score of the set of relevance scores is indicative of whether the user will initiate at least one task requiring a respective third party agent of third party agent modules 128.

Agent recommendation modules 182 may select one or more third party agents of third party agent modules 128 to recommend to the user. More specifically, for example, agent recommendation modules 182 may select one or more third party agents of third party agent modules 128 that have a respective relevance score that satisfies a threshold. The threshold may be indicative of a minimum interest threshold of the user. The threshold may be predefined (e.g., selected by a one or more of computing devices 110), user selected, or dynamically configurable based on user input (e.g., decreased when the user accepts a recommendation and increased when a user refuses a recommendation). In some examples, increasing a relevance score may indicate a higher user interest. In such examples, a respective relevance score that satisfies a threshold may be greater than the threshold. For instance, where a user purchases from a website for clothing company Y using a browser of computing device 110A, agent recommendation modules 182 may increase a relevance score for a third party agent module 128A that is for enabling purchases from clothing company Y. In this instance, agent recommendation modules 182 recommends third party agent module 128A that is for purchasing from clothing company Y because the relevance score for a third party agent module 128A is greater than the threshold. However, in some examples, decreasing a relevance score may indicate a higher user interest. In such examples, a respective relevance score that satisfies a threshold may be less than the threshold. Although in the above examples agent recommendation modules 182 recommended a single third party agent module, in other examples, agent recommendation modules 182 may recommend two or more of third party agent modules 128.

Agent recommendation modules 182 may sort a recommendation of third party agent module 128 using relevance scores. For example, when two or more of third party agent modules 128 have a respective relevance score that satisfies a threshold, agent recommendation modules 182 may sort the two or more of third party agent modules 128 by the relevance score. For instance, when third party agent module 128A-C have relevance scores, 97, 80, and 90 that satisfies a threshold of 75, agent recommendation modules 182 may sort a recommendation to suggest a ranked list that starts with third party agent module 128A, then third party agent module 128C, and then third party agent module 128B.

In an effort to link assistant modules 122 with useful third party agent modules 128 and prevent inadvertent sharing of personal or sensitive information, agent recommendation modules 182 may cause a signaling to the user indicating a recommendation to configure a user account of a digital assistant service with third party agent modules 128. For example, agent recommendation modules 182 may cause UID 112 to output a visible notification of "Would you like me to link to your digital assistant account with transportation company X?" As discussed further, in some examples, agent recommendation modules 182 may cause UID 112 to output privacy information about the third party agent modules 128. For instance, agent recommendation modules 182 may cause UID 112 to output a visible notification of "Would you like to see what information is shared with Transportation company X?" In this way, a user of the digital assistant may accept a recommendation to configure a user account of the digital assistant with third party agent modules 128 that permits the user to easily control the sharing of personal or sensitive information with third party agent modules 128.

To even further reduce a setup time, agent recommendation modules 182 may cause a signaling to the user indicating a recommendation to configure a user account of a digital assistant service with more than one of third party agent modules 128. For example, agent recommendation modules 182 may output all of the selected agent recommendation modules 182. For instance, agent recommendation modules 182 may cause UID 112 to output a visible notification of "Would you like me to link to your digital assistant account with transportation company X, news company Y, and review service Z?" In some examples, agent recommendation modules 182 may output a set of two or more agents of the selected agent recommendation modules 182. For instance, agent recommendation modules 182 may cause UID 112 to output a visible notification of "Would you like me to link to your digital assistant account with news company Y and review service Z?," and, after receiving an indication of consent from the user, output another visible notification of "Would you like me to also link to your digital assistant account with transportation company X?".

In response to receiving the indication of consent from the user (e.g., a touch sensitive surface of UID 112 determining a selection indicating "Yes, link my digital assistant account", a microphone of UID 112 capturing audio of a voice input indicating a user response "Yes, link my digital assistant account", and the like), agent recommendation modules 182 may configure the user account of the digital assistant service for operation with the selected third party agent modules 128.

In an effort to expedite configuring assistant module 122 without inundating the user with trivial requests, agent recommendation module 182 may, automatically, with user permission, request user data from third party agent server systems 170 to support the selected third party agent modules 128. Further, in instances where the user has granted permission to share personal or sensitive information with third party agent modules 128, agent recommendation module 182 may output, automatically, without further user input, an indication of authentication information to third party agent server systems 170 and share information about the user account already setup by the user at digital assistant server 160. In this way, agent recommendation module 182 may simplify a setup to configure assistant module 122 with third party agent modules 128 without necessarily inundating the user with trivial and repetitive requests for user information.

Agent recommendation modules 182 may recommend one or more third party agent modules 128 during a setup of computing device 110B, such as initiating the user account of the digital assistant service, computing device 110B first being powered on, an out-of-box experience, or another setup. Additionally, or alternatively, agent recommendation modules 182 may re-engage the user by recommending one or more third party agent modules 128 in response to information indicative of interests of the user. For instance, agent recommendation modules 182 may recommend third party agent module 128A for ordering pizza from pizza company X at 4:45 PM on a Friday in response to receiving an e-mail receipt indicating that the user has previously ordered pizza at 5:00 PM on Friday. In this manner, agent recommendation modules 182 may recommend one or more third party agent modules 128 that are useful at a time that a user is likely to utilize the services of the recommended one or more third party agent modules 128.

Among the several benefits provided by the aforementioned approach are: (1) the processing complexity and time for a device to act may be reduced by directing the user to the useful third party agents rather than relying on specific inquiries from the user; (2) agent information may be stored locally reducing the need for complex and memory-consuming transmission security protocols on the user's device for the private data; (3) because the example assistant directs the user to third party agents, fewer specific inquiries may be requested by the user, thereby reducing demands on a user device for query rewriting and other computationally complex data retrieval; and (4) network usage may be reduced as the data that the local agent recommendation module needs to respond to specific inquires may be reduced as a quantity of specific inquires is reduced.

Figure 2:
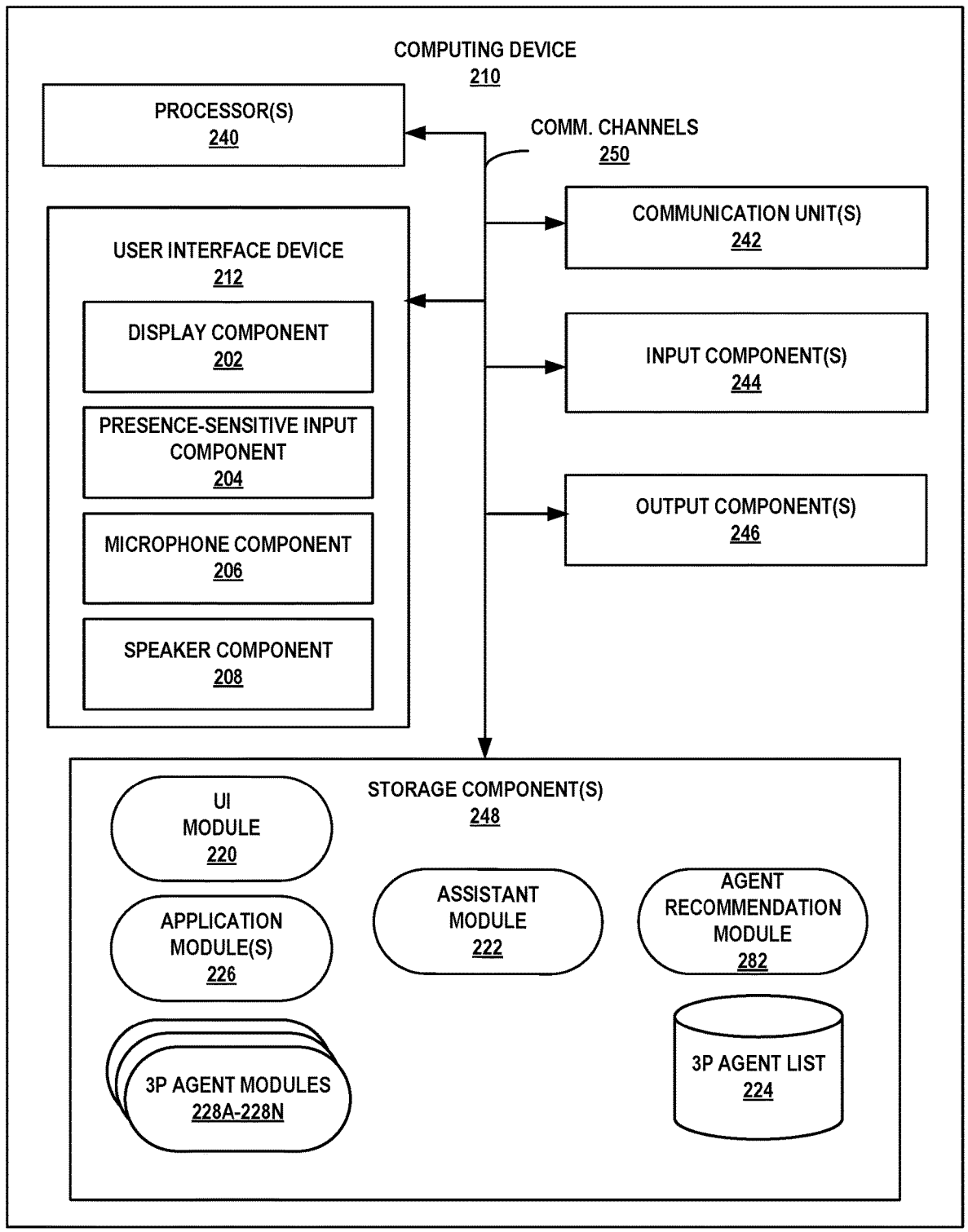
FIG. 2 is a block diagram illustrating an example computing device that is configured to execute an example digital assistant, in accordance with one or more aspects of the present disclosure.

FIG. 2 is a block diagram illustrating an example computing device that is configured to execute an example digital assistant, in accordance with one or more aspects of the present disclosure. Computing device 210 of FIG. 2 is described below as an example of computing device 110A of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface device (UID) 212, one or more processors 240, one or more communication units 242, one or more input components 244, one or more output components 246, and one or more storage components 248. UID 212 includes display component 202, presence-sensitive input component 204, microphone component 206, and speaker component 208. Storage components 248 of computing device 210 include UI module 220, assistant module 222, one or more application modules 226, third party agent modules 228A-N (collectively, third party agent modules 228), agent recommendation module 282, and third party agent list 224.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices (e.g., computing devices 110B-C, digital assistant server 160, and/or third party agent server systems 170 of system 100 of FIG. 1) via one or more wired and/or wireless networks by transmitting and/or receiving network signals on one or more networks (e.g., network 130 of system 100 of FIG. 1). Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, text, audio, image, and video input. Input components 244 of computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 244 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, step counter sensor.

One or more output components 246 of computing device 210 may generate output. Examples of output are tactile, audio, and video output. Output components 246 of computing device 210, in one example, includes a presence-sensitive display, sound card, video graphics adapter card, speaker, cathode ray tube (CRT) monitor, liquid crystal display (LCD), or any other type of device for generating output to a human or machine.

UID 212 of computing device 210 may be similar to UID 112 of computing device 110A and includes display component 202, presence-sensitive input component 204, microphone component 206, and speaker component 208. Display component 202 may be a screen at which information is displayed by UID 212 while presence-sensitive input component 204 may detect an object at and/or near display component 202. Speaker component 208 may be a speaker from which audible information is played by UID 212 while microphone component 206 may detect audible input provided at and/or near display component 202 and/or speaker component 208.

While illustrated as an internal component of computing device 210, UID 212 may also represent an external component that shares a data path with computing device 210 for transmitting and/or receiving input and output. For instance, in one example, UID 212 represents a built-in component of computing device 210 located within and physically connected to the external packaging of computing device 210 (e.g., a screen on a mobile phone). In another example, UID 212 represents an external component of computing device 210 located outside and physically separated from the packaging or housing of computing device 210 (e.g., a monitor, a projector, etc. that shares a wired and/or wireless data path with computing device 210).

As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, presence-sensitive input component 204 may present a user interface.

Speaker component 208 may comprise a speaker built-in to a housing of computing device 210 and in some examples, may be a speaker built-in to a set of wired or wireless headphones that are operably coupled to computing device 210. Microphone component 206 may detect audible input occurring at or near UID 212. Microphone component 206 may perform various noise cancellation techniques to remove background noise and isolate user speech from a detected audio signal.

UID 212 of computing device 210 may detect two-dimensional and/or three-dimensional gestures as input from a user of computing device 210. For instance, a sensor of UID 212 may detect a user's movement (e.g., moving a hand, an arm, a pen, a stylus, etc.) within a threshold distance of the sensor of UID 212. UID 212 may determine a two or three-dimensional vector representation of the movement and correlate the vector representation to a gesture input (e.g., a hand-wave, a pinch, a clap, a pen stroke, etc.) that has multiple dimensions. In other words, UID 212 can detect a multi-dimension gesture without requiring the user to gesture at or near a screen or surface at which UID 212 outputs information for display. Instead, UID 212 can detect a multi-dimensional gesture performed at or near a sensor which may or may not be located near the screen or surface at which UID 212 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 226, 228, and 282 may be operable by processors 240 to perform various actions, operations, or functions of computing device 210. For example, processors 240 of computing device 210 may retrieve and execute instructions stored by storage components 248 that cause processors 240 to perform the operations modules 220, 222, 226, 228, and 282. The instructions, when executed by processors 240, may cause computing device 210 to store information within storage components 248.

One or more storage components 248 within computing device 210 may store information for processing during operation of computing device 210 (e.g., computing device 210 may store data accessed by modules 220, 222, 226, 228, and 282 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, 226, 228, and 282 and third party agent list 224. Storage components 248 may include a memory configured to store data or other information associated with modules 220, 222, 226, 228, and 282 and third party agent list 224.

UI module 220 may include all functionality of UI module 120 of computing device 110A of FIG. 1 and may perform similar operations as UI module 120 for managing a user interface that computing device 210 provides at UID 212 for example, for facilitating interactions between a user of computing device 110A and assistant module 222. For example, UI module 220 of computing device 210 may receive information from assistant module 222 that includes instructions for outputting (e.g., displaying or playing audio) an assistant user interface. UI module 220 may receive the information from assistant module 222 over communication channels 250 and use the data to generate a user interface. UI module 220 may transmit a display or audible output command and associated data over communication channels 250 to cause UID 212 to present the user interface at UID 212.

In some examples, UI module 220 may receive an indication of one or more user inputs detected at UID 212 and may output information about the user inputs to assistant module 222. For example, UID 212 may detect a voice input from a user and send data about the voice input to UI module 220.

UI module 220 may send an indication of the voice input to assistant module 222 for further interpretation. Assistant module 222 may determine, based on the voice input, that the detected voice input represents a user request for assistant module 222 to perform one or more tasks.

Application modules 226 represent all the various individual applications and services executing at and accessible from computing device 210 that may be accessed by an assistant, such as assistant module 222, to provide user with information and/or perform a task. A user of computing device 210 may interact with a user interface associated with one or more application modules 226 to cause computing device 210 to perform a function. Numerous examples of application modules 226 may exist and include, a fitness application, a calendar application, a search application, a map or navigation application, a transportation service application (e.g., a bus or train tracking application), a social media application, a game application, an e-mail application, a chat or messaging application, an Internet browser application, or any and all other applications that may execute at computing device 210.

In operation, agent recommendation module 282 may identify one or more tasks to be initiated by assistant module 222. For example, in response to receiving an indication that a user indicates interest in a task for requesting automobile transportation, agent recommendation module 282 may determine third party agent list 224 to indicate third party agent modules 228 that can provide services related to requesting automobile transportation.

UI module 220 may output, to agent recommendation module 282, a signal indicating one or more of application modules 226 that are executing at computing device 210. In this example, each of the one or more of application modules 226 is associated with a particular third party agent of third party agent list 224. For instance, UI module 220 may output a unique application identifier that indicates a developer account associated with a particular vender. In this example, agent recommendation module 282 may increase, based on the signal indicating a particular application module of application modules 226 that is executing at computing device 210 and the particular application module being associated with third party agent module 228A, a respective relevance score for third party agent module 228A to indicate that the user will initiate a task requiring third party agent module 228A. For instance, in response to receiving, from a package manager of UI module 220, the unique application identifier that indicates a developer account associated with a particular vender and determining that the particular vender is associated with third party agent module 228A, agent recommendation module 282 may increase a respective relevance score for third party agent module 228A.

Agent recommendation module 282 may increase, based on the signal indicating an activity level for particular application module of application modules 226 that is executing at computing device 210 and the particular application module being associated with third party agent module 228A, a respective relevance score for third party agent module 228A to indicate that the user will initiate a task requiring third party agent module 228A. Examples of activity level for a particular application may include a time duration since the particular application was last executed, a number of times that the particular application has been executed since a predetermined threshold (e.g., day, week, month, year, etc.), or another activity level for the particular application. For example, in response to receiving, from an application indexing API, contact manager, etc. of UI module 220, the unique application identifier that indicates a developer account associated with a particular vender, an indication that the application was executed today, and determining that the particular vender is associated with third party agent module 228A, agent recommendation module 282 may increase a respective relevance score for third party agent module 228A. In response, however, to determining that the application was not executed within the last month, agent recommendation module 282 may decrease a respective relevance score for third party agent module 228A. In another example, agent recommendation module 282 may increase a respective relevance score for third party agent module 228A in response to determining that the application was executed during the last month more than ten times.

UI module 220 may output, to agent recommendation module 282, a signal indicating a third party account associated with the user of computing device 210. In this example, the third party account is associated with a third party agent module of third party agent modules 228. For instance, UI module 220 may output a unique vender identifier that indicates a developer account associated with a particular vender. In this example, agent recommendation module 282 may increase, based on the signal indicating the third party account associated with the user of computing device 210 and the third party account being associated with third party agent module 228B, a respective relevance score for third party agent module 228B to indicate that the user will initiate a task requiring third party agent module 228B. For instance, in response to receiving, from UI module 220, the unique vender identifier that indicates a developer account associated with a particular vender and determining that the particular vender is associated with third party agent module 228B, agent recommendation module 282 may increase a respective relevance score for third party agent module 228B.

UI module 220 may output, to agent recommendation module 282, a signal indicating that the user has accessed a particular website using computing device 210. In this example, the particular website is associated with a third party agent module of third party agent modules 228. For instance, UI module 220 may output a uniform resource locator (URL) that indicates a particular vender. In this example, agent recommendation module 282 may increase, based on the signal indicating that the user has accessed the particular website using computing device 210 and the particular website being associated with third party agent module 228C, a respective relevance score for third party agent module 228C to indicate that the user will initiate a task requiring third party agent module 228C. For instance, in response to receiving, from UI module 220, an indication that the user recently browsed a website at the URL www-.companyx.com and determining that third party agent module 228C is associated with a vender account that identifies the URL www.companyx.com, agent recommendation module 282 may increase a respective relevance score for third party agent module 228C.

Communication units 242 may output, to agent recommendation module 282, a signal indicating computing device 110C available for connection with computing device 210. In this example, computing device 110C is associated with a third party agent module of third party agent modules 228. Examples of a signal indicating a computing device may include, but is not limited to, a media access control (MAC) address, a host name, a universal plug and play (UPnP) name, UPnP device, zero-configuration networking (Zeroconf®), domain name system service (DNS SRV) record, Bonjour® name, address resolution (ARP) protocol, or another signal. For instance, communication units 242 may receive, from computing device 110C, a UPnP name that indicates a particular vender for a smart light system. In some instances, communication unites 242 may output a broadcast message requesting the signal indicating a computing device (e.g., a MAC address and MAC vender). In this example, agent recommendation module 282 may increase, based on the signal indicating computing device 110C available for connection with computing device 210 and the particular vender being associated with third party agent module 228D, a respective relevance score for third party agent module 228D to indicate that the user will initiate a task requiring third party agent module 228D. For instance, in response to receiving, from communication units 242, an indication that computing device 110C is available for connection with computing device 210 and has a UPnP name that indicates a particular vender for a smart light system and determining that the particular vender is associated with third party agent module 228BD, agent recommendation module 282 may increase a respective relevance score for third party agent module 228D.

Agent recommendation modules 282 may select one or more third party agents of third party agent modules 128 to recommend to the user. More specifically, for example, agent recommendation modules 182 may rank third party agent modules 128 based on the set of relevance scores to generate third party agent list 224. In this example, agent recommendation modules 282 may select one or more third party agents of third party agent list 224 to recommend to the user that are the highest ranking. For instance, agent recommendation modules 282 may select one or more third party agents of third party agent list 224 to recommend to the user that are the highest ranking and that satisfy a threshold. In another example, agent recommendation modules 282 may select a specific quantity of third party agents of third party agent list 224 to recommend to the user that are the highest ranking. The specific quantity of third party agents may be predefined (e.g., selected by a one or more of computing devices 110), user selected, or dynamically configurable based on user input (e.g., decreased when the user accepts a recommendation and increased when a user refuses a recommendation).

Agent recommendation modules 282 may cause a signaling to the user indicating a recommendation to configure a user account of a digital assistant service with third party agent modules 128. For example, agent recommendation modules 182 may cause display component 202 to output a visible notification of "Would you like me to setup your digital assistant account with pizza company XYZ?" As discussed further, in some examples, agent recommendation modules 282 may cause display component 202 to output privacy information about the third party agent modules 228. For instance, agent recommendation modules 282 may cause display component 202 to output a visible notification of "Would you like to see what information is shared with Pizza company XYZ?"

In response to receiving the indication of consent from the user (e.g., a touch sensitive surface of presence-sensitive input component 204 determining a selection indicating "Yes, link my digital assistant account," microphone component 206 capturing audio of a voice input indicating a user response "Yes, link my digital assistant account", and the like), agent recommendation modules 282 may configure the user account of the digital assistant service for operation with the selected third party agent modules 228. Agent recommendation module 182 may, automatically, with user permission, request user data to support third party agents 228 that the user approved for configuration with the user account for assistant module 222. For example, in response to receiving the indication of consent from the user, agent recommendation module 282 may retrieve user data to support third party agent 228A from third party agent server system 170A, user data to support third party agent 228B from third party agent server system 170B, . . . , and user data to support third party agent 228N from third party agent server system 170N.

Recommendation module 282 may output an indication informing the user of capabilities for each of the one or more recommended third party agent modules 228. For example, agent recommendation module 282 may cause display component 202 to output a visible notification of "With the pizza company XYZ agent you can order pizza and see special deals. Would you like me to setup your digital assistant account with pizza company XYZ??" In some examples, agent recommendation module 282 may output an indication informing the user of capabilities for each of the one or more recommended third party agent modules 228 based on user information. For instance, in response to determining, based on an e-mail received at an e-mail account associated with the user, that the user is planning to book a flight using Airline ABC and that third party agent module 228A is capable of booking the flight using Airline ABC, agent recommendation module 282 may cause display component 202 to output a visible notification of "With the Airline ABC agent you can book a flight and confirm your reservation. Would you like me to setup your digital assistant account with the Airline ABC agent?".

Figure 3:
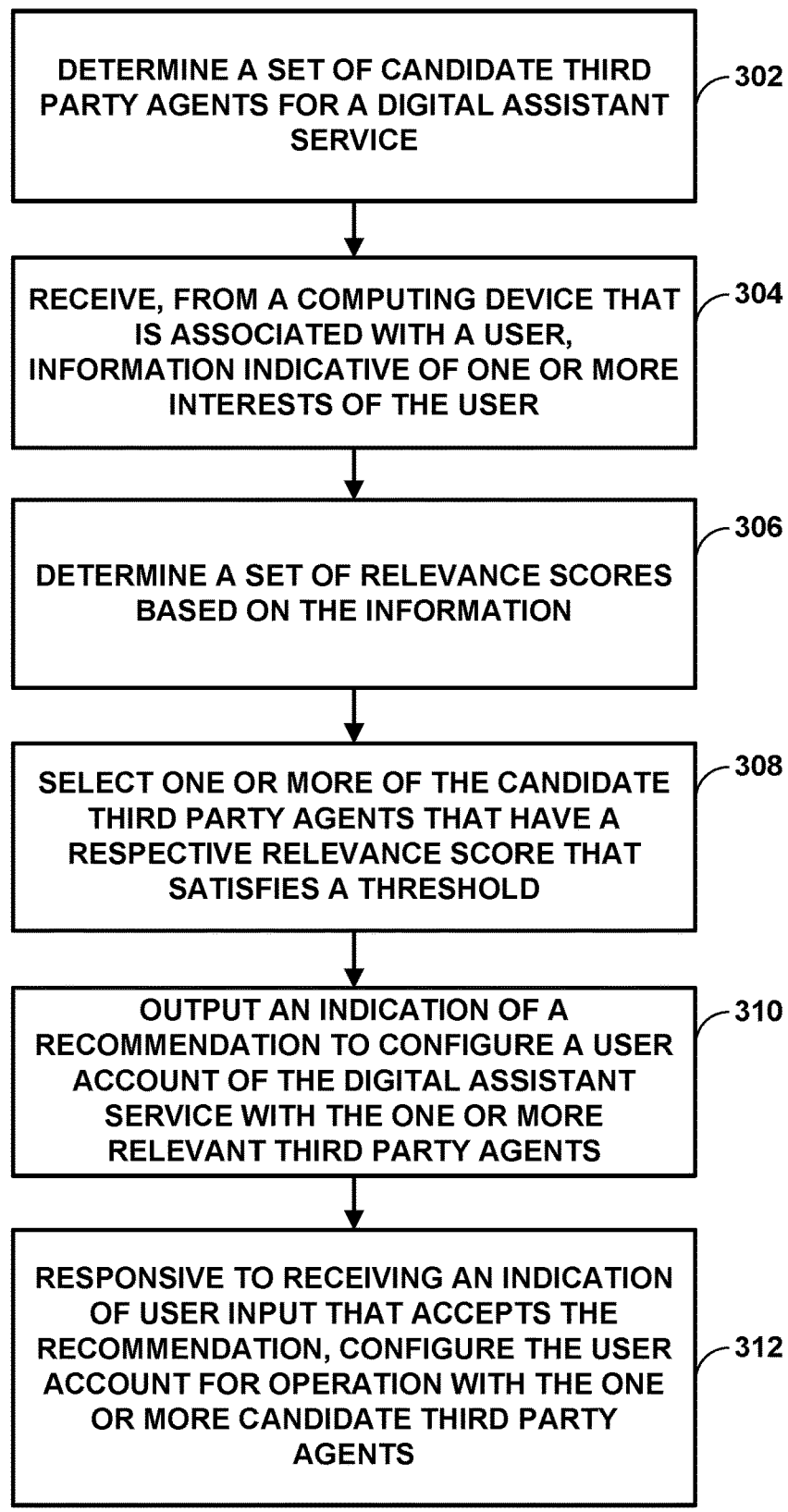
FIG. 3 is a flowchart illustrating example operations performed by one or more processors executing an example digital assistant, in accordance with one or more aspects of the present disclosure.

FIG. 3 is a flowchart illustrating example operations performed by one or more processors executing an example digital assistant, in accordance with one or more aspects of the present disclosure. FIG. 3 is described below in the context of system 100 of FIG. 1. For example, assistant module 122A while executing at one or more processors of computing device 110A may perform operations 302-312, in accordance with one or more aspects of the present disclosure. And in some examples, agent recommendation modules 182 while executing at one or more processors of computing devices 110 and/or digital assistant server 160 may perform operations 302-312, in accordance with one or more aspects of the present disclosure. For purposes of illustration only, FIG. 3 is described below within the context of computing device 110A of FIG. 1.

In operation, agent recommendation modules 182 determine a set of candidate third party agents for a digital assistant service (302). For example, in response to receiving an indication that a user indicates interest in a task for requesting weather information, agent recommendation modules 182 may determine third party agent lists 124 to indicate third party agent modules 128 that can provide weather information. In some examples, agent recommendation modules 182 may determine third party agent lists 124 to indicate each third party agent modules 128 that may be configured for operation with assistant modules 122.

Agent recommendation modules 182 receives, from a computing device that is associated with a user, information indicative of one or more interests of the user (304). For example, agent recommendation modules 182 receives an indication of a particular application module of application modules 226 executing at computing device 210 of FIG. 2 from computing device 210 of FIG. 2. In some examples, agent recommendation modules 182 may optionally determine third party agent lists 124 as a sub-set of one or more of third party agent modules 128 based the information indicative of one or more interests of the user. For example, in response to determining that the information indicative of one or more interests of the user relates to third party agent modules 128A-C, agent recommendation modules 182 may determine third party agent lists 124 as third party agent modules 128A-C to perform operations 306-312.

Agent recommendation modules 182 determine a set of relevance scores based on the information (306). For example, agent recommendation modules 182 increases a relevance score associated with third party agent module 128A in response to receiving the indication that the particular application module of application modules 226 is executing at computing device 210 of FIG. 2 and determining that the particular application module is associated with third party agent module 128A. Agent recommendation modules 182 selects one or more of the candidate third party agents that have a respective relevance score that satisfies a threshold (308). For example, agent recommendation modules 182 selects third party agent module 128A when the relevance score associated with third party agent module 128A is greater than a threshold. In another example, agent recommendation modules 182 selects third party agent modules 128A-N when the respective relevance score associated with third party agent modules 128A-N are greater than the threshold.

Agent recommendation modules 182 output an indication of a recommendation to configure a user account of the digital assistant service with the one or more relevant third party agents (310). For example, agent recommendation modules 182 cause a speaker component of UID 112 to output a voice notification that says "Would you like me to link to your digital assistant account with News Company 123?". Responsive to receiving an indication of user input that accepts the recommendation, agent recommendation modules 182 configure the user account for operation with the one or more candidate third party agents (312). For example, a microphone component of UID 112 detects audible input from a user that says "Yes, please link my account." In this example, in response to detecting the audible input, agent recommendation modules 182 retrieve data necessary for operating third party agent module 128A.

Figure 4:
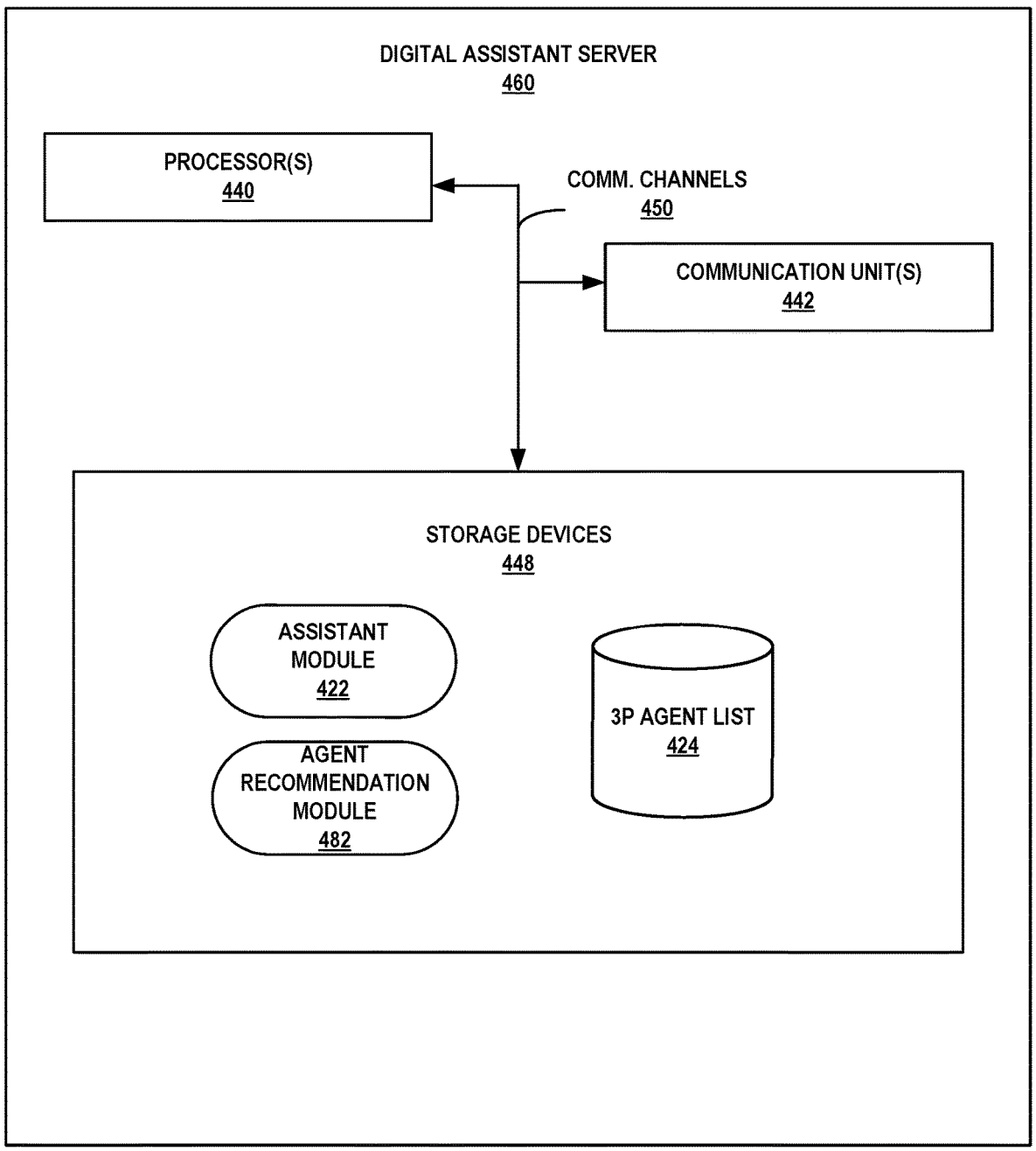
FIG. 4 is a block diagram illustrating an example server system that is configured to execute an example digital assistant, in accordance with one or more aspects of the present disclosure.

FIG. 4 is a block diagram illustrating an example computing system that is configured to execute an example digital assistant, in accordance with one or more aspects of the present disclosure. Digital assistant server 460 of FIG. 4 is described below as an example of digital assistant server 160 of FIG. 1. FIG. 4 illustrates only one particular example of digital assistant server 460, and many other examples of digital assistant server 460 may be used in other instances and may include a subset of the components included in example digital assistant server 460 or may include additional components not shown in FIG. 4.

As shown in the example of FIG. 4, digital assistant server 460 includes user one or more processors 440, one or more communication units 442, and one or more storage components 448. Storage components 448 include assistant module 422, agent recommendation module 482, and third party agent list 424.

Processors 440 are analogous to processors 240 of computing system 210 of FIG. 2. Communication units 442 are analogous to communication units 242 of computing system 210 of FIG. 2. Storage components 448 are analogous to storage components 248 of computing system 210 of FIG. 2. Communication channels 450 are analogous to communication channels 250 of computing system 210 of FIG. 2 and may therefore interconnect each of the components 440, 442, and 448 for inter-component communications. In some examples, communication channels 450 may include a system bus, a network connection, an inter-process communication data structure, or any other method for communicating data.

Assistant module 422 may include all functionality of assistant modules 122 of FIG. 1, as well as assistant module 222 of computing device 210 of FIG. 2. Assistant module 422 may perform similar operations as assistant module 122B for providing an assistant service that is accessible via digital assistant server 460. That is, assistant module 422 may act as an interface to a remote assistance service accessible to a computing device that is communicating over a network with digital assistant server 460. For example, assistant module 422 may be an interface or API to assistance module 122A of computing device 110A of FIG. 1.

Agent recommendation module 482 may include all functionality of agent recommendation module 182 of FIG. 1, as well as agent recommendation module 282 of computing device 210 of FIG. 2. Agent recommendation module 482 may perform similar operations as agent recommendation module 182C for providing an assistant service that is accessible via digital assistant server 460. That is, agent recommendation module 182 may act as an interface to a remote agent recommendation service accessible to a computing device that is communicating over a network with digital assistant server 460. For example, agent recommendation module 482 may be an interface or API to agent recommendation module 182A of computing device 110A of FIG. 1.

Similar to third party agent list 224 of FIG. 2, third party agent list 424 may store information related to agents, such as third party agents. Assistant module 422 and/or agent recommendation module 482 may rely on the information stored at third party agent list 424, in addition to any information provided by assistant module 422, to perform assistant tasks and/or recommend agents for utterance satisfaction.

In general, digital assistant server 460 may provide an agent directory that users may browse to discover/find agents that they might like to use. The directory may have a description of each agent, a list of capabilities (in natural language; e.g., "you can use this agent to order a taxi", "you can use this agent to find food recipes"). If the user finds an agent in the directory that they would like to use, the user may select the agent and the agent may be made available to the user. For instance, agent recommendation module 482 may add the agent into third party agent list 224 and/or third party agent list 424. As such, agent recommendation module 482 may select the added agent to satisfy future utterances. In some examples, one or more agents may be added into third party agent list 224 and/or third party agent list 424 without user selection. In some of such examples, agent recommendation module 482 may be able to select and/or suggest agents that have not been selected by a user to satisfy user utterances. In some examples, agent recommendation module 482 may further rank agents based on whether they were selected by the user.

Appended to this description is a plurality of claims directed to various embodiments of the disclosed subject matter. It will be appreciated that embodiments of the disclosed subject matter may also be within the scope of various combinations of said claims, such as dependencies and multiple dependencies there between. Therefore, by reference thereto, all such dependencies and multiple dependencies, explicit or otherwise, form a portion of this description.

The following numbered clauses may illustrate one or more aspects of the disclosure:

Clause 1. A method comprising: determining, by a digital assistant device, a set of candidate third party agents for a digital assistant service, the set of candidate third party agents being accessible via the digital assistant device; receiving, by the digital assistant device, from a computing device that is associated with a user, information indicative of one or more interests of the user; determining, by the digital assistant device, based on the information, a set of relevance scores, each relevance score of the set of relevance scores being indicative of whether the user will initiate at least one task requiring a respective candidate third party agent of the set of candidate third party agents; selecting, by the digital assistant device, one or more candidate third party agents from the set of candidate third party agents that have a respective relevance score that satisfies a threshold; outputting an indication of a recommendation to configure a user account of the digital assistant service with the one or more candidate third party agents, wherein the user account of the digital assistant service is associated with the user; and responsive to receiving an indication of user input that accepts the recommendation to configure the user account of the digital assistant service with the one or more candidate third party agents, configuring, by the digital assistant device, the user account of the digital assistant service for operation with the one or more candidate third party agents.

Clause 2. The method of clause 1, wherein: the information comprises a signal indicating a software application executing at the computing device, wherein the software application is associated with a particular candidate third party agent of the set of candidate third party agents; and determining the set of relevance scores comprises increasing, by the digital assistant device, based on the signal indicating the software application executing at the computing device and the software application being associated with the particular candidate third party agent, a respective relevance score for the particular candidate third party agent to indicate that the user will initiate a task requiring the particular candidate third party agent.

Clause 3. The method of any one of clauses 1-2, wherein: the information comprises a signal indicating a third party account associated with the user, wherein the third party account is associated with a particular candidate third party agent of the set of candidate third party agents; and determining the set of relevance scores comprises increasing, by the digital assistant device, based on the signal indicating the third party account and the third party account being associated with the particular candidate third party agent, a respective relevance score for the particular candidate third party agent to indicate that the user will initiate a task requiring the particular candidate third party agent.

Clause 4. The method of any one of clauses 1-3, wherein: the information comprises a signal indicating that the user has accessed a particular website using the computing device, wherein the particular website is associated with a particular candidate third party agent of the set of candidate third party agents; and determining the set of relevance scores comprises increasing, by the digital assistant device, based on the signal indicating that the user has accessed the particular website using the computing device and the particular website being associated with the particular candidate third party agent of the set of candidate third party agents, a respective relevance score for the particular candidate third party agent to indicate that the user will initiate a task requiring the particular candidate third party agent.

Clause 5. The method of any one of clauses 1-4, wherein: the computing device is a first computing device; the information comprises a signal indicating a second computing device available for connection with the first computing device, wherein the second computing device is associated with a particular candidate third party agent of the set of candidate third party agents; and determining the set of relevance scores comprises increasing, by the digital assistant device, based on the signal indicating the second computing device available for connection with the first computing device and the second computing device being associated with the particular candidate third party agent, a respective relevance score for the particular candidate third party agent to indicate that the user will initiate a task requiring the particular candidate third party agent.

Clause 6. The method of any one of clauses 1-5, wherein selecting the one or more candidate third party agents from the set of candidate third party agents comprises: ranking, by the digital assistant device, based on the set of relevance scores, the set of candidate third party agents to generate a ranked list of candidate third party agents; and selecting, by the digital assistant device, the one or more candidate third party agents having a highest ranking in the ranked list of candidate third party agents as the one or more candidate third party agents.

Clause 7. The method of any one of clauses 1-6, wherein configuring the user account of the digital assistant service comprises outputting an indication of authentication information associated with the user account of the digital assistant service to a third party server configured to operate with at least one third party agent of the one or more candidate third party agents.

Clause 8. The method of any one of clauses 1-7, wherein configuring the user account of the digital assistant service comprises outputting, by the digital assistant device, an indication informing the user of capabilities for each of the one or more candidate third party agents.

Clause 9. The method of any one of clauses 1-8, wherein: the one or more candidate third party agents are a plurality of candidate third party agents; and configuring the user account of the digital assistant service comprises requesting, by the digital assistant device, user data to support the plurality of candidate third party agents.

Clause 10. The method of any one of clauses 1-9, wherein determining the set of candidate third party agents is responsive to initiating the user account of the digital assistant service.

Clause 11. The method of any one of clauses 1-10, wherein determining the set of candidate third party agents is responsive to the digital assistant device first being powered on.

Clause 12. The method of any one of clauses 1-11, further comprising: identifying, by the digital assistant device, one or more tasks to be initiated by the digital assistant, wherein determining the set of candidate third party agents is based on the one or more tasks.

Clause 13. A digital assistant device comprising: at least one processor; and at least one memory comprising instructions that when executed, cause the at least one processor to provide a digital assistant configured to: determine a set of candidate third party agents for a digital assistant service, the set of candidate third party agents being accessible via the digital assistant device; receive, from a computing device that is associated with a user, information indicative of one or more interests of the user; determine based on the information, a set of relevance scores, each relevance score of the set of relevance scores being indicative of whether the user will initiate at least one task requiring a respective candidate third party agent of the set of candidate third party agents; select one or more candidate third party agents from the set of candidate third party agents that have a respective relevance score that satisfies a threshold, wherein an indication of a recommendation to configure a user account of the digital assistant service with the one or more candidate third party agents is output and wherein the user account of the digital assistant service is associated with the user; and responsive to receiving an indication of user input that accepts the recommendation to configure the user account of the digital assistant service with the one or more candidate third party agents, configure the user account of the digital assistant service for operation with the one or more candidate third party agents.

Clause 14. The digital assistant device of clause 13, wherein: the information comprises a signal indicating a software application executing at the computing device, wherein the software application is associated with a particular candidate third party agent of the set of candidate third party agents; and to determine the set of relevance scores, the digital assistant is configured to increase, based on the signal indicating the software application executing at the computing device and the software application being associated with the particular candidate third party agent, a respective relevance score for the particular candidate third party agent to indicate that the user will initiate a task requiring the particular candidate third party agent.

Clause 15. The digital assistant device of any one of clauses 13-14, wherein: the information comprises a signal indicating a third party account associated with the user, wherein the third party account is associated with a particular candidate third party agent of the set of candidate third party agents; and to determine the set of relevance scores, the digital assistant is configured to increase, based on the signal indicating the third party account and the third party account being associated with the particular candidate third party agent, a respective relevance score for the particular candidate third party agent to indicate that the user will initiate a task requiring the particular candidate third party agent.

Clause 16. The digital assistant device of any one of clauses 13-15, wherein: the information comprises a signal indicating that the user has accessed a particular website using the computing device, wherein the particular website is associated with a particular candidate third party agent of the set of candidate third party agents; and to determine the set of relevance scores, the digital assistant is configured to increase, based on the signal indicating that the user has accessed the particular website using the computing device and the particular website being associated with the particular candidate third party agent of the set of candidate third party agents, a respective relevance score for the particular candidate third party agent to indicate that the user will initiate a task requiring the particular candidate third party agent.

Clause 17. The digital assistant device of any one of clauses 13-16, wherein: the computing device is a first computing device; the information comprises a signal indicating a second computing device available for connection with the first computing device, wherein the second computing device is associated with a particular candidate third party agent of the set of candidate third party agents; and to determine the set of relevance scores, the digital assistant is configured to increase, by the digital assistant device, based on the signal indicating the second computing device available for connection with the first computing device and the second computing device being associated with the particular candidate third party agent, a respective relevance score for the particular candidate third party agent to indicate that the user will initiate a task requiring the particular candidate third party agent.

Clause 18. The digital assistant device of any one of clauses 13-17, wherein to select the one or more candidate third party agents from the set of candidate third party agents, the digital assistant is configured to: rank, based on the set of relevance scores, the set of candidate third party agents to generate a ranked list of candidate third party agents; and select the one or more candidate third party agents having a highest ranking in the ranked list of candidate third party agents as the one or more candidate third party agents.

Clause 19. The digital assistant device of any one of clauses 13-18, wherein to configure the user account of the digital assistant service, the digital assistant is configured to output an indication of authentication information associated with the user account of the digital assistant service to a third party server configured to operate with at least one third party agent of the one or more candidate third party agents.

Clause 20. The digital assistant device of any one of clauses 13-19, wherein to configure the user account of the digital assistant service, the digital assistant is configured to output an indication informing the user of capabilities for each of the one or more candidate third party agents.

Clause 21. The digital assistant device of any one of clauses 13-20, wherein: the one or more candidate third party agents are a plurality of candidate third party agents; and to configure the user account of the digital assistant service, the digital assistant is configured to request user data to support the plurality of candidate third party agents.

Clause 22. The digital assistant device of any one of clauses 13-21, wherein the digital assistant is configured to determine the set of candidate third party agents in response to an initiation of the user account of the digital assistant service.

Clause 23. The digital assistant device of any one of clauses 13-22, wherein the digital assistant is configured to determine the set of candidate third party agents in response to the digital assistant device first being powered on.

Clause 24. The digital assistant device of any one of clauses 13-23, wherein the digital assistant is further configured to identify one or more tasks to be initiated by the digital assistant and wherein the digital assistant is configured to determine the set of candidate third party agents based on the one or more tasks.

Clause 25. A computer-readable storage medium comprising instructions that, when executed cause at least one processor to provide a digital assistant configured to: determine a set of candidate third party agents for a digital assistant service, the set of candidate third party agents being accessible via the digital assistant device; receive, from a computing device that is associated with a user, information indicative of one or more interests of the user; determine based on the information, a set of relevance scores, each relevance score of the set of relevance scores being indicative of whether the user will initiate at least one task requiring a respective candidate third party agent of the set of candidate third party agents; select one or more candidate third party agents from the set of candidate third party agents that have a respective relevance score that satisfies a threshold, wherein an indication of a recommendation to configure a user account of the digital assistant service with the one or more candidate third party agents is output and wherein the user account of the digital assistant service is associated with the user; and responsive to receiving an indication of user input that accepts the recommendation to configure the user account of the digital assistant service with the one or more candidate third party agents, configure the user account of the digital assistant service for operation with the one or more candidate third party agents.

Clause 26. A computing device comprising at least one processor and at least one memory comprising instructions that when executed, cause the at least one processor to perform the method of any one of clauses 1-12.

Clause 27. A computer-readable storage medium comprising instructions that, when executed cause at least one processor of a computing device to perform the method of any one of clauses 1-12.

Clause 28. A computing device comprising means for performing the method of any one of clauses 1-12.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
   determining, by a digital assistant device, a set of candidate third party agents for a digital assistant service, the set of candidate third party agents being accessible via the digital assistant device, and each candidate third party agent, included in the set of third party agents, being associated with one or more corresponding home automation devices;
   receiving, by the digital assistant device, from a computing device that is associated with a user, information indicative of one or more interests of the user, wherein receiving the information indicative of the one or more interests of the user is based on one or more software applications installed on the computing device that is associated with the user, and wherein a given one of the one or more software applications is associated with a corresponding particular candidate third party agent of the set of candidate third party agents;
   determining, by the digital assistant device, based on the information, a set of relevance scores, each relevance score of the set of relevance scores being indicative of whether the user will initiate at least one task using a respective candidate third party agent of the set of candidate third party agents;
   automatically selecting, by the digital assistant device, one or more third party agents from the set of candidate third party agents that have a respective relevance score that satisfies a threshold, wherein the one or more selected third party agents includes the corresponding particular candidate third party agent associated with the given one of the one or more software applications installed on the computing device that is associated with the user;
   in response to automatically selecting the one or more third party agents from the set of candidate third party agents by the digital assistant device:
      causing, by the digital assistant device, to be provided for output at the computing device that is associated with the user, an indication of a recommendation to configure a user account of the digital assistant service with the one or more selected third party agents, wherein the user account of the digital assistant service is associated with the user, and wherein the indication of the recommendation to configure the user account of the digital assistant service identifies each of the one or more selected third party agents to be configured for the user account;

in response to receiving an indication of user input that accepts the recommendation to configure the user account of the digital assistant service with one or more of the selected third party agents:

automatically configuring, by the digital assistant device, the user account of the digital assistant service for operation with the one or more selected third party agents to subsequently control one or more particular home automation devices, of the one or more corresponding home automation devices, associated with the corresponding particular third party agent; and subsequent to automatically configuring the user account of the digital assistant service for operation with the one or more selected third party agents by the digital assistant device:

receiving an indication of further user input directed to the corresponding particular candidate third party agent associated with the given one of the one or more software applications installed on the computing device that is associated with the user; and in response to receiving the indication of the further user input, causing the one or more particular home automation devices associated with the corresponding particular candidate third party agent to be controlled based on the further user input.

2. The method of claim 1, wherein:
determining the set of relevance scores comprises adjusting, by the digital assistant device, based on the one or more software applications being installed on the computing device and the one or more software applications being associated with the particular candidate third party agent, a respective relevance score for the particular candidate third party agent to indicate that the user will initiate a task using the particular candidate third party agent.

3. The method of claim 1, wherein:
the information indicative of the one or more interests of the user is based further on a third party account associated with the user, wherein the third party account is associated with the corresponding particular candidate third party agent; and
determining the set of relevance scores comprises adjusting, by the digital assistant device, based on the third party account being associated with the corresponding particular candidate third party agent, a respective relevance score for the corresponding particular candidate third party agent to indicate that the user will initiate a task using the corresponding particular candidate third party agent.

4. The method of claim 1, wherein:
the information indicative of the one or more interests of the user is based further on the user having accessed a particular website using the computing device, wherein the particular website is associated with the corresponding particular candidate third party agent; and
determining the set of relevance scores comprises adjusting, by the digital assistant device, based on the user having accessed the particular website using the computing device and the particular website being associated with the corresponding particular candidate third party agent of the set of candidate third party agents, a respective relevance score for the corresponding particular candidate third party agent to indicate that the user will initiate a task using the corresponding particular candidate third party agent.

5. The method of claim 1, wherein:
the computing device is a first computing device;
the information indicative of the one or more interests of the user is based further on a second computing device being available for connection with the first computing device, wherein the second computing device is associated with the corresponding particular candidate third party agent; and
determining the set of relevance scores comprises adjusting, by the digital assistant device, based on the second computing device being available for connection with the first computing device and the second computing device being associated with the corresponding particular candidate third party agent, a respective relevance score for the corresponding particular candidate third party agent to indicate that the user will initiate a task using the corresponding particular candidate third party agent.

6. The method of claim 1, wherein selecting the one or more third party agents from the set of candidate third party agents comprises:
ranking, by the digital assistant device, based on the set of relevance scores, the set of candidate third party agents to generate a ranked list of candidate third party agents; and
selecting, by the digital assistant device, the one or more third party agents having a highest ranking in the ranked list of candidate third party agents as the one or more third party agents.

7. The method of claim 1, wherein configuring the user account of the digital assistant service comprises outputting an indication of authentication information associated with the user account of the digital assistant service to a third party server configured to operate with at least one third party agent of the set of third party agents.

8. The method of claim 1, wherein configuring the user account of the digital assistant service comprises outputting, by the digital assistant device, an indication informing the user of capabilities for each of the one or more third party agents included in the set of candidate third party agents.

9. The method of claim 1, wherein:
the one or more third party agents are a plurality of candidate third party agents; and
configuring the user account of the digital assistant service comprises requesting, by the digital assistant device, user data to support the plurality of candidate third party agents.

10. The method of claim 1, wherein determining the set of candidate third party agents is responsive to initiating the user account of the digital assistant service.

11. The method of claim 1, wherein determining the set of candidate third party agents is responsive to the digital assistant device first being powered on.

12. The method of claim 1, further comprising:
identifying, by the digital assistant device, one or more tasks to be initiated by the digital assistant, wherein determining the set of candidate third party agents is based on the one or more tasks.

13. A digital assistant device comprising:
at least one processor; and
at least one memory comprising instructions that when executed, cause the at least one processor to provide a digital assistant configured to:
  determine a set of candidate third party agents for a digital assistant service, the set of candidate third party agents being accessible via the digital assistant device, and each candidate third party agent, included in the set of third party agents, being associated with one or more corresponding home automation devices;
  receive, from a computing device that is associated with a user, information indicative of one or more interests of the user, wherein receiving the information indicative of the one or more interests of the user is based on one or more software applications installed on the computing device that is associated with the user, and wherein a given one the one or more software applications is associated with a corresponding particular candidate third party agent of the set of candidate third party agents;
  determine, based on the information, a set of relevance scores, each relevance score of the set of relevance scores being indicative of whether the user will initiate at least one task using a respective candidate third party agent of the set of candidate third party agents;
  automatically select one or more third party agents from the set of candidate third party agents that have a respective relevance score that satisfies a threshold, wherein the one or more selected third party agents includes the corresponding particular candidate third party agent associated with given one of the one or more software applications installed on the computing device that is associated with the user;
  in response to automatically selecting the one or more third party agents from the set of candidate third party agents by the digital assistant device:
    cause, to be provided for output at the computing device that is associated with the user, an indication of a recommendation to configure a user account of the digital assistant service with the one or more selected third party agents, wherein the user account of the digital assistant service is associated with the user, and wherein the indication of the recommendation to configure the user account of the digital assistant service identifies each of the one or more selected third party agents to be configured for the user account;
  in response to receiving an indication of user input that accepts the recommendation to configure the user account of the digital assistant service with one or more of the selected third party agents:
    automatically configure the user account of the digital assistant service for operation with the one or more selected third party agents to subsequently control one or more particular home automation devices, of the one or more corresponding home automation devices, associated with the corresponding particular third party agent; and
  subsequent to automatically configuring the user account of the digital assistant service for operation with the one or more selected third party agents by the digital assistant device:
    receive an indication of further user input directed to the corresponding particular candidate third party agent associated with the given one of the one or more software applications installed on the computing device that is associated with the user; and
    in response to receiving the indication of the further user input, cause the one or more particular home automation devices associated with the corresponding particular candidate third party agent to be controlled based on the further user input.

14. The digital assistant device of claim 13, wherein:
to determine the set of relevance scores, the digital assistant is configured to adjust, based on the one or more software applications being installed on the computing device and the one or more software applications being associated with the particular candidate third party agent, a respective relevance score for the particular candidate third party agent to indicate that the user will initiate a task using the particular candidate third party agent.

15. The digital assistant device of claim 13, wherein:
the information indicative of the one or more interests of the user is based further on a third party account associated with the user, wherein the third party account is associated with the corresponding particular candidate third party agent; and
to determine the set of relevance scores, the digital assistant is configured to adjust, based on the third party account being associated with the corresponding particular candidate third party agent, a respective relevance score for the corresponding particular candidate third party agent to indicate that the user will initiate a task using the corresponding particular candidate third party agent.

16. The digital assistant device of claim 13, wherein:
the information indicative of the one or more interests of the user is based further on the user having accessed a particular website using the computing device, wherein the particular website is associated with the corresponding particular candidate third party agent; and
to determine the set of relevance scores, the digital assistant is configured to adjust, based on the user having accessed the particular website using the computing device and the particular website being associated with the corresponding particular candidate third party agent of the set of candidate third party agents, a respective relevance score for the corresponding particular candidate third party agent to indicate that the user will initiate a task using the corresponding particular candidate third party agent.

17. The digital assistant device of claim 13, wherein:
the computing device is a first computing device;
the information indicative of the one or more interests of the user is based further on a second computing device being available for connection with the first computing device, wherein the second computing device is associated with the corresponding particular candidate third party agent; and
to determine the set of relevance scores, the digital assistant is configured to adjust, by the digital assistant device, based on the second computing device being available for connection with the first computing device and the second computing device being associated with the corresponding particular candidate third party agent, a respective relevance score for the corresponding particular candidate third party agent to indicate that the user will initiate a task using the corresponding particular candidate third party agent.

18. The digital assistant device of claim 13, wherein to select the one or more third party agents from the set of candidate third party agents, the digital assistant is configured to:
- rank, based on the set of relevance scores, the set of candidate third party agents to generate a ranked list of candidate third party agents; and
- select the one or more candidate third party agents having a highest ranking in the ranked list of third party agents as the one or more candidate third party agents.

19. The digital assistant device of claim 13, wherein to configure the user account of the digital assistant service, the digital assistant is configured to output an indication of authentication information associated with the user account of the digital assistant service to a third party server configured to operate with at least one third party agent set of third party agents.

20. A non-transitory computer-readable storage medium comprising instructions that, when executed cause at least one processor to provide a digital assistant configured to:
- determine a set of candidate third party agents for a digital assistant service, the set of candidate third party agents being accessible via the digital assistant device, and each candidate third party agent, included in the set of third party agents, being associated with one or more corresponding home automation devices;
- receive, from a computing device that is associated with a user, information indicative of one or more interests of the user, wherein receiving the information indicative of the one or more interests of the user is based on the computing device that is associated with the user detecting a connection of the computing device with one or more additional computing devices via a local area connection, and wherein a given one the one or more additional computing devices is associated with a corresponding particular candidate third party agent of the set of candidate third party agents;
- determine, based on the information, a set of relevance scores, each relevance score of the set of relevance scores being indicative of whether the user will initiate at least one task using a respective candidate third party agent of the set of candidate third party agents;
- automatically select one or more third party agents from the set of candidate third party agents that have a respective relevance score that satisfies a threshold, wherein the one or more selected third party agents includes the corresponding particular candidate third party agent associated with the given one of the one or more additional computing devices detected via the local area connection;
- in response to automatically selecting the one or more third party agents from the set of candidate third party agents by the digital assistant device:
  - cause, to be provided for output at the computing device of the user, an indication of a recommendation to configure a user account of the digital assistant service with the one or more selected third party agents, wherein the user account of the digital assistant service is associated with the user, and wherein the indication of the recommendation to configure the user account of the digital assistant service identifies each of the one or more selected third party agents to be configured for the user account;
- in response to receiving an indication of user input that accepts the recommendation to configure the user account of the digital assistant service with one or more of the selected third party agents:
  - automatically configure the user account of the digital assistant service for operation with the one or more selected third party agents to control one or more particular home automation devices, of the one or more corresponding home automation devices, associated with the corresponding particular third party agent; and
- subsequent to automatically configuring the user account of the digital assistant service for operation with the one or more selected third party agents by the digital assistant device:
  - receive an indication of further user input directed to the corresponding particular candidate third party agent associated with the given one of the one or more additional computing devices detected via the local area connection; and
  - in response to receiving the indication of the further user input, cause the one or more particular home automation devices associated with the corresponding particular candidate third party agent to be controlled based on the further user input.

* * * * *